United States Patent [19]
Beer et al.

[11] 3,847,068
[45] Nov. 12, 1974

[54] FATLESS FRYING PAN

[76] Inventors: Carl Beer, Taborton Rd., Sand Lake, N.Y. 12153; Steven Vincent Beer, 312 Eastwood Ave., Ithaca, N.Y. 14850

[22] Filed: July 30, 1973

[21] Appl. No.: 383,598

Related U.S. Application Data

[62] Division of Ser. No. 180,811, Sept. 15, 1971, abandoned.

[52] U.S. Cl. .................................. 99/425, 126/390
[51] Int. Cl. ............................................. A47j 37/10
[58] Field of Search ...... 126/373, 376, 390; 99/375, 99/400, 408, 422, 425, 444, 446, 450; 220/70.4 A

[56] References Cited
UNITED STATES PATENTS

| | | | |
|---|---|---|---|
| 1,447,813 | 3/1923 | Patrick | 126/390 X |
| 1,505,675 | 8/1924 | Stirn | 126/390 X |
| 1,733,450 | 10/1929 | Detwiler | 126/390 X |
| 2,262,302 | 11/1941 | Sinclair | 99/425 |
| 2,534,407 | 12/1950 | Bramberry | 126/390 |
| 3,079,855 | 3/1963 | Valis | 99/425 X |
| 3,469,524 | 9/1969 | Trozzolo | 126/390 X |

FOREIGN PATENTS OR APPLICATIONS

| | | | |
|---|---|---|---|
| 906,643 | 9/1962 | Great Britain | 126/390 |
| 12,106 | 10/1887 | Great Britain | 99/425 |

*Primary Examiner*—William F. O'Dea
*Assistant Examiner*—William C. Anderson

[57] ABSTRACT

The invention concerns a self-draining fry pan having a convex surface for frying food and having a peripheral channel for collecting fat or grease from frying food, circumferentially disposed about the frying surface. Arresting means are provided for preventing food placed on said frying surface from contacting the fat or grease collected in said channel.

4 Claims, 4 Drawing Figures

PATENTED NOV 12 1974 3,847,068

FATLESS FRYING PAN

This is a division, of application Ser. No. 180,811 filed Sept. 15, 1971, and now abandoned.

BACKGROUND OF THE INVENTION

Certain items of food — hamburgers, sausages, sausage patties, pork chops, release comparatively large quantities of fat upon frying. The fat contained in these items is solid at room temperature and below, but becomes liquid at temperatures prevailing during the cooking process. When using the conventional top-of-stove frying pan, fat accumulates at the bottom of the pan. The fat forms a liquid layer in the pan. This fat layer gets deeper and deeper as the frying process continues. The food items being fried become soaked in the liquid fat; this results in the well known "pan-fried" character of the food so cooked. The "pan-fried" character of such items of food is unsightly and detrimental from a dietary point of view. Also, food items thus fried, shrink heavily during the frying process and have an objectionable taste to some.

When using a griddle-type cooking device, the "fat-soaked" condition prevailing in a frying pan is relieved only very slightly. Griddle-type devices have a flat bottom surrounded by a grease gutter. When frying fatty items of food, a comparatively thick layer of liquid fat is created covering the area of the griddle near the item of food being fried. This layer of fat again produces the fat-soaked condition described in the preceding paragraph, albeit to a somewhat lesser extent. Griddle-type cooking devices cannot be used with a cover and are not top-of-stove devices.

Rib-type frying pans have recently been placed on the market. The frying surface of these pans is not uninterrupted, but is ribbed. The food is placed atop the ribs. Fat drains away in the valleys or grooves formed by the ribs. The shortcoming of this pan is obvious: only a fraction of the surface of the food item being fried comes in contact with the hot frying surface. The result is a much higher frying time and a lack of crispness of the fried item.

SUMMARY OF THE INVENTION

It is a primary object of the invention to provide a frying device on which liquid fat, released from the food, is continuously drained from the bottom of the pan.

It is another object to provide a "fatless" frypan usefuly atop a conventional gas or electric stove, useable with a cover and economical to manufacture.

It is an additional object to provide a self-draining fry pan offering an uninterrupted frying surface and adapted to prevent contact of frying food and drained fat.

These objective and others are realized by the fatless frying pan of this invention which is characterized by a convex bottom, a peripheral grease gutter surrounding the convex bottom and an arresting means, aa stop fence spaced about the circumference of the bottom, abutting the grease gutter.

The outer rim which forms the outside shore of the grease gutter is high enough to support a cover for the pan. If it is desired to employ the pan for use in conjunction with an electric heating element, a plurality of parallel ribs may be spaced underneath the pan to transmit heat from the element to the pan by conduction.

The following advantages are attained when using the fatless frying pan of this invention instead of a conventional frying pan or a griddle: the food is less fatty and therefore healthier; the food is tastier; and the food does not shrink as much.

BRIEF DESCRIPTION OF THE DRAWINGS

The following drawings illustrate somewhat preferred embodiments of the invention.

DESCRIPTION OF PREFERRED EMBODIMENTS

Figure 1:
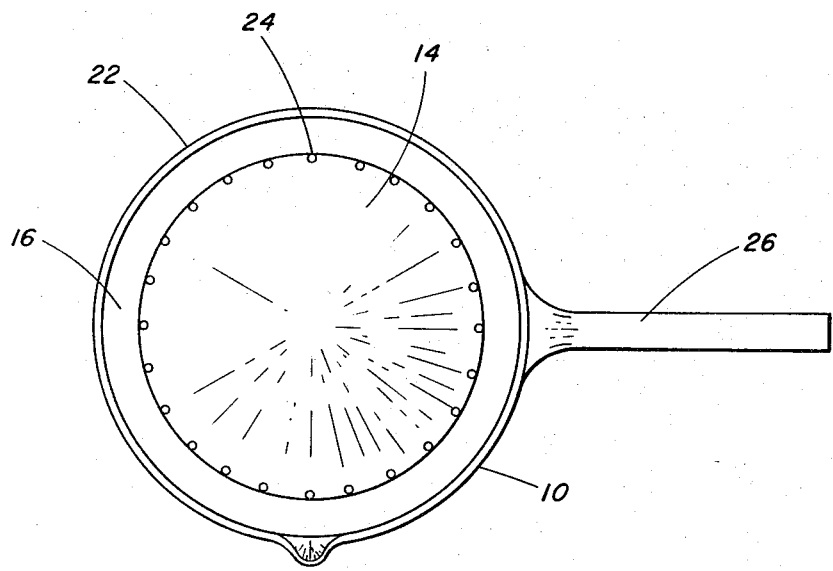
FIG. 1 is a perspective view of the pan.
Figure 2:
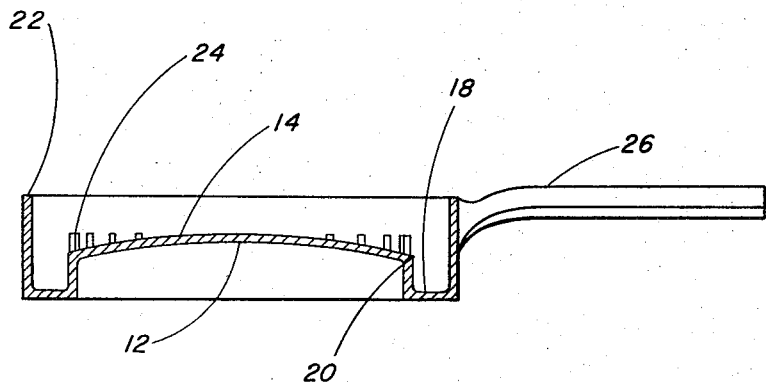
FIG. 2 is a cross-sectional view of a side elevation of the pan.

Reference is now made to FIGS. 1 and 2. Pan 10 is generally circular. Pan base 12 is convex to permit grease to drain from food cooked on its frying surface 14. A circular channel or grease gutter 16 is circumferentially disposed about base 12 to collect drained grease. The level of channel floor 18 is below the level of rim 20 of the pan frying surface to facilitate drainage and to prevent overflow of grease onto the surface.

Sidewall 22 rises perpendicularly from channel floor 18 and is circumferentially disposed about the channel. Sidewall 22 is spaced sufficiently above the center of curvature of frying surface 14 as to permit a cover to be placed over the pan during frying of food.

A stop fence formed from a plurality of upstanding posts 24 is circumferentially disposed about rim 20 of surface 14. The fence arrests any movement of food fried on frying surface 14 and prevents mixing of the food with any grease collected in channel 16.

Handle 26 is integrally connected to the outer wall of sidewall 22 for support purposes. If desired, the handle may be removably connected employing conventional fastening mechanisms. Other conventional grasping means may be substitued for the handle.

Figure 3:
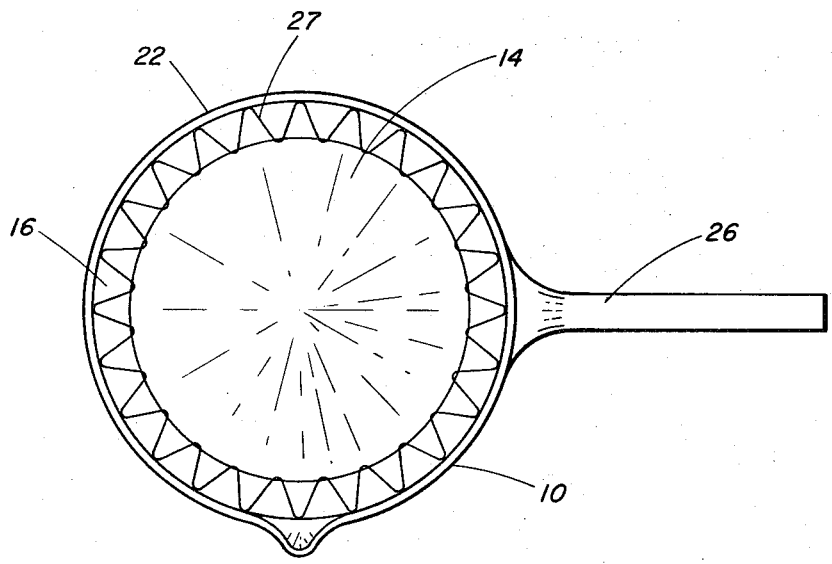
FIG. 3 is a perspective view of a second embodiment of the invention.
Figure 4:
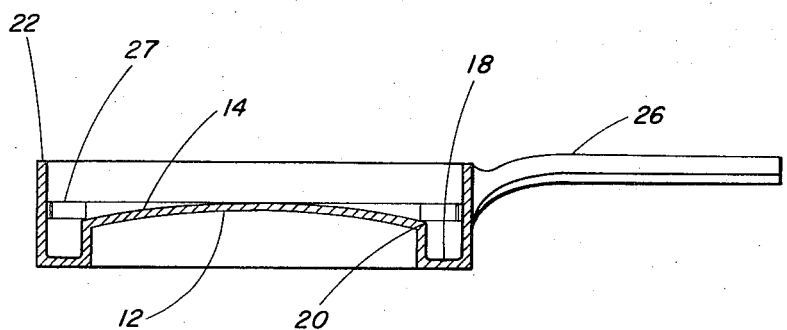
FIG. 4 is a cross-sectional view of a side elevation of the pan of FIG. 3.

Turning now to FIGS. 3 and 4, there is illustrated another embodiment of the pan. This embodiment is similar to that shown in FIGS. 1 and 2, except that the means for preventing the food from sliding into the collecting channel consists of a ring 27 formed from a strip of crimped sheet metal and placed atop the channel. Ring 27 rests on the convex frying surface 14. The ring may easily be removed for cleaning. If desired, the ring could be affixed to the periphery of the frying surface and/or the sidewall.

Pan 10 may be formed from conventional heat conducting material such as iron, copper, aluminum or the like. If desired, frying surface 14 may be coated with a non-stick material, such as polytetrafluoroethylene, sold under the trademark TEFLON. The handle is formed from conventional heat insulating material, such as wood, or ceramic. If desired, a spout may be formed in the outer sidewall for pouring off collected fat.

An exemplary fry pan is formed from cast aluminum. The convex frying surface has a spherical curvature of 14 inch radius. The stop posts are each one-half inch in height; three-sixteenths inch in diameter and are spaced three-fourths inch apart. The grease gutter is three-fourths inch wide and three-fourth inch deep.

The invention is not to be limited except as set forth in the following claims:

I claim:

1. A self-draining fry pan which comprises;
   a. a convex surface for frying foods;
   b. a channel for collecting fat or grease from frying food circumferentially disposed about the frying surface, said channel having an inner side wall connected to the periphery of said frying surface and an outer side wall forming an outer pan rim, the base of said channel being below the periphery of said frying surface;
   c. means for arresting the frying food on said convex surface and for preventing said food from contacting said fat or grease collected in said channel which comprises a member having crimped lateral walls and which is disposed about the periphery of the convex surface and atop said channel, said crimped lateral side walls extending to a height above the lowest point on said convex surface; and
   d. means connected to said inner side wall for grasping said fry pan.

2. A fray pan according to claim 1 wherein said member is removable for cleaning.

3. A fry pan according to claim 1 wherein said member is affixed to the periphery of said convex surface.

4. A fry pan according to claim 1 wherein said member is affixed to said inner side wall.

* * * * *